US010109944B2

(12) United States Patent
Marr et al.

(10) Patent No.: US 10,109,944 B2
(45) Date of Patent: Oct. 23, 2018

(54) PROTECTIVE GUARD FOR A WALL-MOUNTED ELECTRICAL INTERFACE AND METHOD FOR USING THE SAME

(71) Applicants: Dennis F Marr, Saline, MI (US); Tracy Vaughn Petersen, Granite Bay, CA (US)

(72) Inventors: Dennis F Marr, Saline, MI (US); Tracy Vaughn Petersen, Granite Bay, CA (US)

(73) Assignee: DHT Ventures, LLC, Saline, MI (US)

( * ) Notice: Subject to any disclaimer, the term of this patent is extended or adjusted under 35 U.S.C. 154(b) by 0 days.

(21) Appl. No.: 15/683,762

(22) Filed: Aug. 22, 2017

(65) Prior Publication Data

US 2018/0062300 A1 Mar. 1, 2018

Related U.S. Application Data

(60) Provisional application No. 62/381,339, filed on Aug. 30, 2016.

(51) Int. Cl.

| | |
|---|---|
| ***H01R 13/44*** | (2006.01) |
| ***H01R 13/447*** | (2006.01) |
| ***H01H 9/28*** | (2006.01) |
| ***H01R 13/648*** | (2006.01) |

(Continued)

(52) U.S. Cl.

CPC ........... *H01R 13/447* (2013.01); *H01H 9/286* (2013.01); *H01H 9/287* (2013.01); *H01R 13/648* (2013.01); *H01R 24/78* (2013.01); *H01R 25/006* (2013.01)

(58) Field of Classification Search

CPC ..... H01B 17/24; H01B 17/145; H01R 13/447

See application file for complete search history.

(56) References Cited

U.S. PATENT DOCUMENTS

| | | | | |
|---|---|---|---|---|
| 3,068,442 A * | 12/1962 | Kubik | .................. | H01R 13/447 174/67 |
| 3,109,900 A | 11/1963 | Van Hook | | |
| 4,740,655 A | 4/1988 | Ford | | |

(Continued)

*Primary Examiner* — Dhirubhai R Patel

(57) ABSTRACT

A protective guard prevents undesired access to a wall-mounted electrical interface such as an electrical switch or outlet, particularly by small children. The protective guard includes a baseplate, cover and spring-biased latch. The baseplate is mounted to the wall and contains at least one opening to expose the electrical interface. The cover slidably attaches to the baseplate for sliding movement between a closed position that blocks access to the electrical interface and an open position that exposes the electrical interface. The spring-biased latch is attached to the cover. The latch is actively spring-biased to a locked position that holds the cover in the closed position and has an unlocked position offset from the locked position which allows sliding movement of the cover to its open position to expose the electrical interface. Advantageously, exposing the electrical interface requires no additional parts or tools that should be procured, removed, stored, or could be misplaced. The required actions to expose the electrical interface are difficult to achieve by a small child while an adult has the required strength, motor skills, and cognitive abilities to easily and intuitively accomplish the necessary actions with a one-handed operation.

22 Claims, 22 Drawing Sheets

(51) Int. Cl.
*H01R 25/00* (2006.01)
*H01R 24/78* (2011.01)

(56) References Cited

U.S. PATENT DOCUMENTS 4,952,755 A * 8/1990 Engel .................. H01R 13/447 174/67
5,107,075 A * 4/1992 Currier, Jr. ........... H01R 13/447 174/67
5,675,126 A 10/1997 Halvorsen
5,738,206 A 4/1998 Souza
5,961,336 A 10/1999 Finlay
5,998,735 A * 12/1999 Patterson, Jr. ........... H02G 3/14 174/67
6,198,046 B1 3/2001 Moodie
6,309,239 B1 10/2001 Johnston
6,342,676 B1 * 1/2002 Ha .......................... H02G 3/14 174/67
6,372,987 B1 * 4/2002 Ha .......................... H02G 3/14 174/66
6,669,492 B1 12/2003 McIlvenna
D507,476 S 7/2005 Zahedi et al.
D514,922 S 2/2006 Zahedi et al.
7,059,877 B2 * 6/2006 Guzelderli ........... H01R 13/447 439/142
7,648,375 B1 1/2010 Jiang
7,674,975 B2 3/2010 Atkinson et al.
8,399,765 B1 * 3/2013 Baldwin .................. H02G 3/14 174/66
8,575,484 B1 * 11/2013 Witherbee ................ H02G 3/14 174/50
8,933,352 B2 1/2015 Jarvinen et al.
9,177,734 B2 11/2015 Todd
9,230,757 B2 1/2016 Rego et al.
2003/0057065 A1 3/2003 Hecker
2011/0198200 A1 8/2011 Drabik
2012/0006577 A1 1/2012 Brantley et al.

* cited by examiner

PROTECTIVE GUARD FOR A WALL-MOUNTED ELECTRICAL INTERFACE AND METHOD FOR USING THE SAME

CROSS REFERENCE TO RELATED APPLICATIONS

This application claims priority under 35 U.S.C. Section 119(e) to U.S. Provisional Application Ser. No. 62/381,339, filed on Aug. 30, 2016, which is incorporated herein by reference.

FIELD OF THE INVENTION

The present invention relates to protective guards for electrical switches, outlets and ports.

BACKGROUND OF THE INVENTION

Electrical interfaces such as wall switches are ubiquitous fixtures found in all buildings to control electrical devices, including: lights, appliances, electronic equipment, garbage disposals, furnaces, and whole house fans. These switches are subject to inadvertent usage by adults and children alike, however, the ability to turn an object on or off with a simple flip of a switch makes this fixture particularly appealing for curious toddlers who have finally grown tall enough to reach it. This newfound skill may not only be annoying to the parent but may also pose a safety hazard if the switch is connected to an appliance or other device that should not be accessible to a small child.

In related art, a number of covers, guards, and devices have been presented in an attempt to prevent the inadvertent and/or undesired activation or deactivation of light/electrical switches by small children. Examples of relevant related art devices can be seen in the following patents:

U.S. Pat. No. 9,230,757 for a "Switch Guard for Restricting the Operation of a Rocker Type Electrical Wall Switch" issued Jan. 5, 2016, to D. Rego et al., describes a guard fitted over an electrical rocker wall switch that allows a user to access/operate the switch only with an implement or tool that fits through apertures that are positioned over the switch rocker arms.

U.S. Pat. No. 9,177,734 for a "Protective Switch Cover System" issued Nov. 3, 2015, to M. Todd, describes a protective cover to help block accidental contact, activation and/or access to an electrical switch but does not prevent intentional movement of the switch via a hand-held tool. Freer access is enabled if snap-off tabs are removed. However, if the tabs are removed, then a small child has the same easy access to the switch as an adult.

U.S. Pat. No. 8,933,352 for an "Electric Switch Enclosure" issued Jan. 13, 2015, to P. Jarvinen et al., describes a cover that employs a childproof cap to prevent access to a switch actuator by children. The cap must be removed when access is desired. Once the cap is removed for desired access, the device also requires the longer length of an adult's finger to reach the switch actuator.

U.S. Pat. App. No. 2012/0006577 for a "Device for Securing Household Systems from Young Children" published Jan. 12, 2012, by K. Brantley et al., describes a two-piece structure where a plate is hingedly attached to the cover, which has a child-resistant lock.

U.S. Pat. App. No. 2011/0198200 for a "Childproof Light Switch Guard" published Aug. 18, 2011, by M. Drabik, describes a switch guard that also relies upon the longer length of an adult's finger to reach and actuate the protected switch. However, as discussed in U.S. Pat. No. 8,933,352 cited above, a child can utilize an elongated object (such as a pencil, pen, crayon or stick) to extend his/her reach to access the switch. Furthermore, this design requires the adult to inconveniently reach from above, as well as stoop down to reach from below, to access and operate the switch.

U.S. Pat. No. D514,922 for an "Electrical Switch Cover" issued Feb. 14, 2006, to A. Zahedi et al., describes a system for apparent use with a toggle type electrical switch featuring a box structure fastened to the plate of the switch and extending over the switch so as to block frontal and side access.

U.S. Pat. No. D507,476 for an "Electrical Switch Cover" issued Jul. 19, 2005, to A. Zahedi et al., like U.S. Pat. No. D514,922 cited above, describes a system for apparent use with a rocker type electrical switch featuring a box structure fastened to the plate of the switch and extending over the switch so as to block frontal and side access.

U.S. Pat. App. No. 2003/0057065 for a "Child-Safe Rocker Switch" published Mar. 27, 2003, by S. Hecker, describes a lockable rocker switch apparatus that replaces a standard electrical switch.

U.S. Pat. No. 5,738,206 for a "Child Resistant Switch Lock" issued Apr. 14, 1998, to M. Souza, describes a switch lock that is arranged to turn a switch on or off only by using a two-handed operation, which is deemed very difficult for a child.

U.S. Pat. No. 3,109,900 for a "Protective Guard for Actuating Devices" issued Nov. 5, 1963, to H. Van Hook, describes an arrangement that utilizes the concept of requiring an adult-sized finger to reach switches or actuation devices.

Related art also exists for protecting electrical wall outlets from undesired access by children, and several can be applied to electrical wall switches. Relevant examples of such related art can be seen in the following patents:

U.S. Pat. No. 7,674,975 for a "Safety Guard Apparatus for an Electrical Outlet" issued Mar. 9, 2010, to N. Atkinson et al., describes a safety guard apparatus with sliding plates for restricting access to the receptacles by a young child. A lock system that requires more force than what a young child is capable of exerting prevents one or more of the cover plates from being opened by the child.

U.S. Pat. No. 7,648,375 for a "Sliding Cover for Electrical Sockets" issued Jan. 19, 2010, to P. Jiang, describes a sliding plate safety device used for covering electrical sockets, using a spring to hold the sliding plate in a prescribed position and requiring a predetermined amount of force to disengage the device.

U.S. Pat. No. 6,669,492 for a "Safety Cover for an Electrical Outlet" issued Dec. 30, 2003, to R. McIlvenna, describes a sliding child safety cover for an electrical outlet whereby access to the outlet requires both side portions of the cover to be depressed inwardly to disengage the latch and strike to gain access to the outlet.

U.S. Pat. No. 6,309,239 for a "Safety Cover for an Electrical Receptacle" issued Oct. 30, 2001, to R. Johnston, describes a safety cover for an electrical receptacle using two half covers, each of which can be slightly compressed to cause projection locks secured into slots in an inner collar about a mounting plate to withdraw, thus releasing each half door.

U.S. Pat. No. 6,198,046 for a "Child Resistant Electrical Receptacle Cover" issued Mar. 6, 2001, to J. Moodie, describes an attachable device to an electric outlet that has a pair of opposing door members hingedly attached to a base plate that provide a child-resistant safety feature by using latches and flange functions that require both doors to be simultaneously unlocked and opened to gain access to the receptacles.

U.S. Pat. No. 5,961,336 for an "Electrical Outlet Safety Device" issued Oct. 5, 1999, to B. Finlay, describes a safety device which replaces the standard outlet cover with one that has a removable sliding cover that must be pushed with a degree of spring force to enable the cover to disengage.

U.S. Pat. No. 5,675,126 for an "Outlet Cover" issued Oct. 7, 1997, to G. Halvorsen, describes an outlet cover with hinged doors that cover the sockets. A latch mechanism latches the doors shut over the sockets to eliminate an electrical shock hazard potential to children.

U.S. Pat. No. 4,740,655 for an "Electrical Receptacle Safety Covering" issued Apr. 26, 1988, to D. Ford, describes an outlet cover with a hinged door and spring-biased security to protect children from access to electrical receptacles.

Stricter methods to control the switches from being manipulated can be employed via switch lock devices or covers/guards that are secured via keylocks or external padlocks—such patents date back to the early 1900s. Although very effective in preventing access to a switch by anyone, such arrangements do not allow for frequent or convenient usage of the switch.

Despite the related art that exists to prevent the inadvertent and/or undesired activation or deactivation of light/electrical switches, only a small percentage of these devices can be specifically applied to childproofing of switches (as opposed to simply shielding the switch from accidental actuation or locking out use of the switch altogether). Even fewer of these devices are designed to be effective in preventing access by a small child while remaining easy and, more importantly, convenient for an adult to operate the protected switch on a regular basis. Frequently, these devices utilize unique motions that a child cannot perform (e.g. simultaneous 2-handed operations, complicated movements, demanding adult finger lengths for switch access, etc.) or require specialized tools to open (e.g. a key or unique tool), but such methods are also inconvenient, awkward, or become annoying for the adult to use on a continuous basis. As a result, the use of these devices is often ultimately abandoned.

There is a continuing need for devices that provide new and improved features in the field of the invention. Further, there are no related art devices possessing the unique features and advantages as in the present invention that attempts to balance the potentially conflicting goals of being difficult to operate by small children while still being easy and convenient to use regularly by adults.

SUMMARY OF THE INVENTION

The present invention provides a novel method and system for preventing undesired access to a wall-mounted electrical interface such as electrical switches by small children. The invention is configured to replace or attach to an existing, standard electrical wall plate and is a self-contained system that covers the electrical wall switch and hides it from view when closed. Unlocking of the invention and operation of the underlying switch do not require any additional parts/tools that should be procured, removed, stored, or could be misplaced.

In one embodiment, the present invention is comprised of a unique baseplate onto which a sliding cover with a spring-biased latch mechanism is attached. The latch position dictates whether or not the cover can be slid open to access the electrical switch underneath. When the latch is in its natural default position, the cover is locked and cannot be retracted. The required actions to unlock the present invention and expose the wall switch are difficult to achieve by a small child reaching overhead; however, for an adult who has the advantage of height, strength, advanced motor skills, and cognitive abilities, these same actions are extremely easy and intuitive to accomplish with a one-handed operation so that frequent use of the present invention is neither annoying nor burdensome.

Although invented specifically for children, the present invention is also effective for limiting an adult's unintended access to a wall switch or any wall-mounted electrical interface such as a fire alarm, control switch, electrical outlets, ports and the like. This is particularly useful for preventing accidental actuation of a switch by those observing the Sabbath or for those that simply want to actively prevent others from using a particular wall switch in a home or building but also wish to easily and conveniently gain access when desired.

DETAILED DESCRIPTION OF THE INVENTION

The present invention and its advantages will become better understood through review of the following detailed description in conjunction with the accompanying figures. Many variations are contemplated for different applications and design considerations. However, for the sake of brevity, each and every contemplated variation is not individually described in the following detailed description and embodiments.

Figure 1:
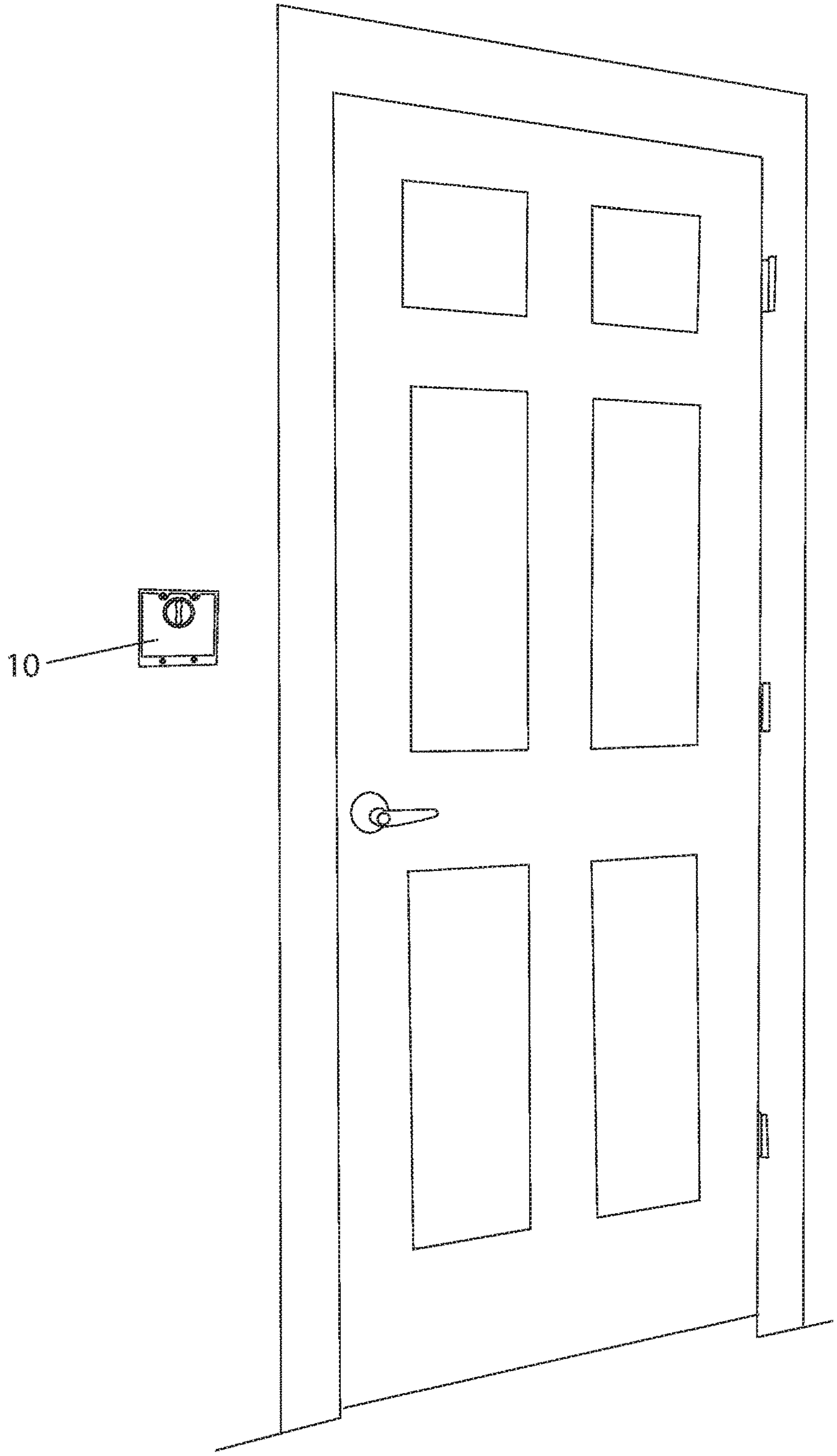
FIG. 1 shows a perspective view of a preferred embodiment of the present invention installed onto an electrical wall switch and protecting the electrical switch underneath.

FIG. 1 shows a perspective view of a preferred embodiment of the present invention in an assembled state (wall switch guard 10) and installed onto an electrical wall switch in a room. In its closed state, the present invention completely covers and prevents access to the electrical switch (es) underneath.

Figure 2:
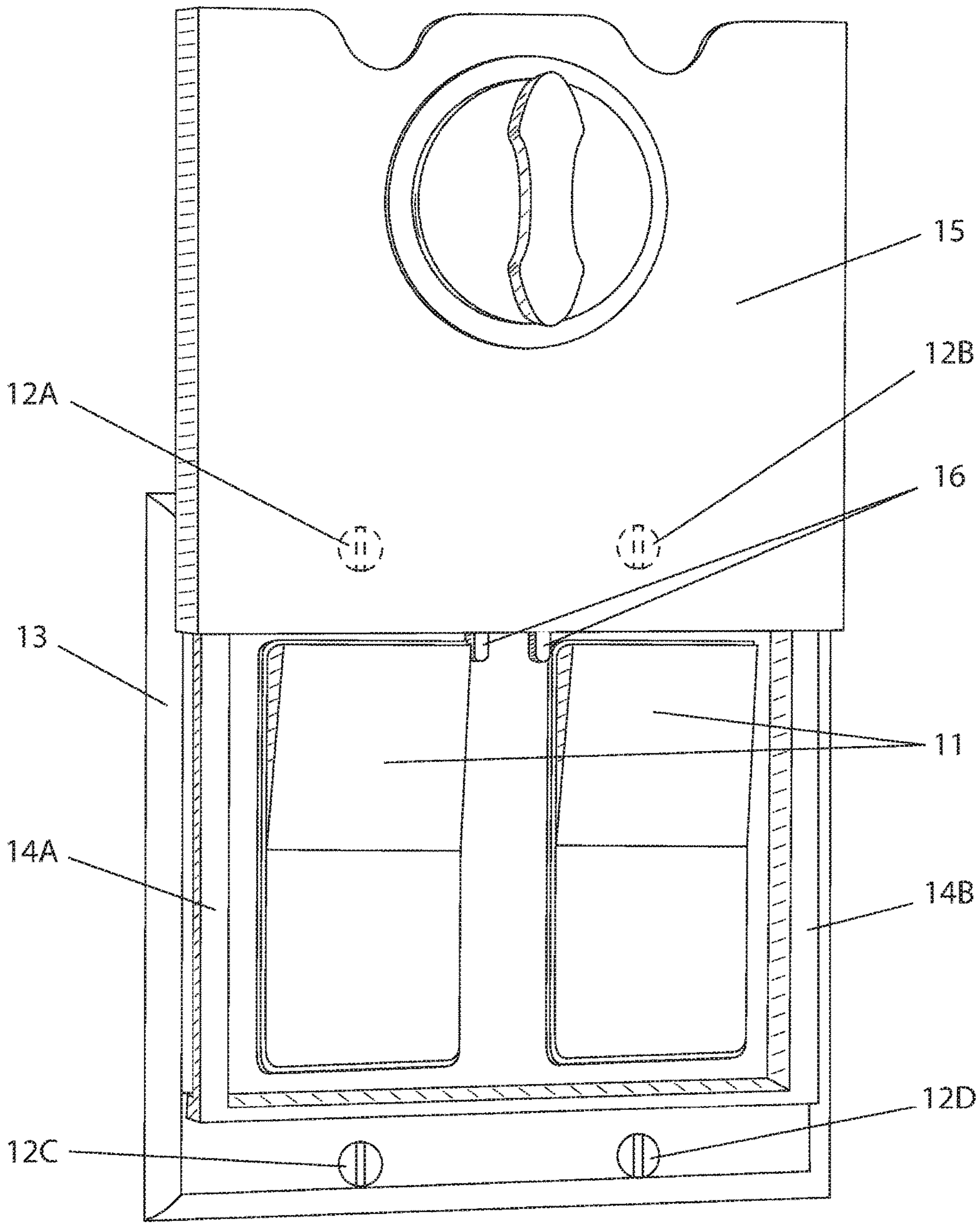
FIG. 2 shows a preferred embodiment of present invention in the open position, allowing access to an electrical switch.

A view of a preferred embodiment of the present invention in its open state is given in FIG. 2, exposing electrical wall switches 11 inside. In this preferred embodiment, installation is achieved by removing the original wall plate of the electrical switches 11 and replacing it with the present invention. Screws 12A-D are used to secure a baseplate 13 onto the wall switches 11; the screws 12A-D may be those that were used to secure the original wall plate. The baseplate 13 contains all the features of a standard electrical wall plate, including opening features to allow the switches to project through and openings to receive the screws, but also includes additional features that interface with the other components of the present invention. These interface features include: 1) guide rails 14A and 14B onto which a cover assembly 15 is slidably attached, and 2) a stationary feature extending from a surface of the baseplate 13, herein referred to as a slide block 16, that is part of a latch mechanism described later herein. The cover assembly 15 slides along the guide rails 14A and 14B and completely covers the electrical wall switches 11 when the present invention is in its closed state.

Figure 3:
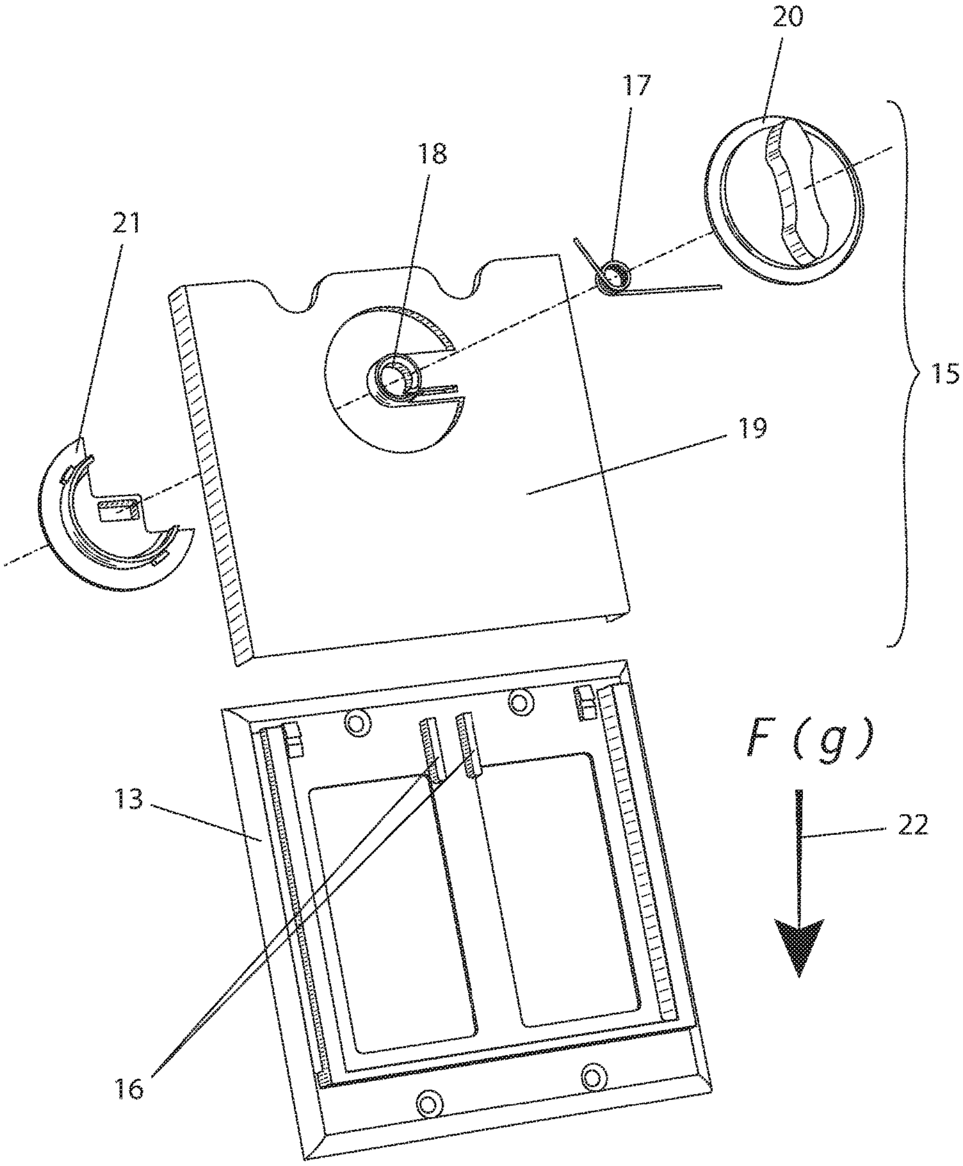
FIG. 3 provides an exploded view of a preferred embodiment of the present invention.

Components of the present invention in a preferred embodiment are given in the exploded view provided in FIG. 3. A torsion spring 17 is installed into a spring retention hole 18 in a cover 19, and a knob construction—comprising of a knob 20 and knob insert 21—is assembled around the installed torsion spring 17 and onto the cover 19. When assembled, the knob construction is forced into a default rotational position by the torsion spring 17, as discussed later herein.

A supportive element of the present invention is an opposing force 22 that resists the movement of the cover assembly 15 from being moved to an open position. In the embodiment of the present invention given in FIG. 3, this opposing force 22 already exists in the form of gravity because the direction of movement to open the cover assembly 15 is up and against this force of gravity. However, means for adding or enhancing the opposing force 22 (including a compression spring, tension spring, or elastic band) can be utilized to support an alternative direction of movement of a cover assembly.

Figure 4:
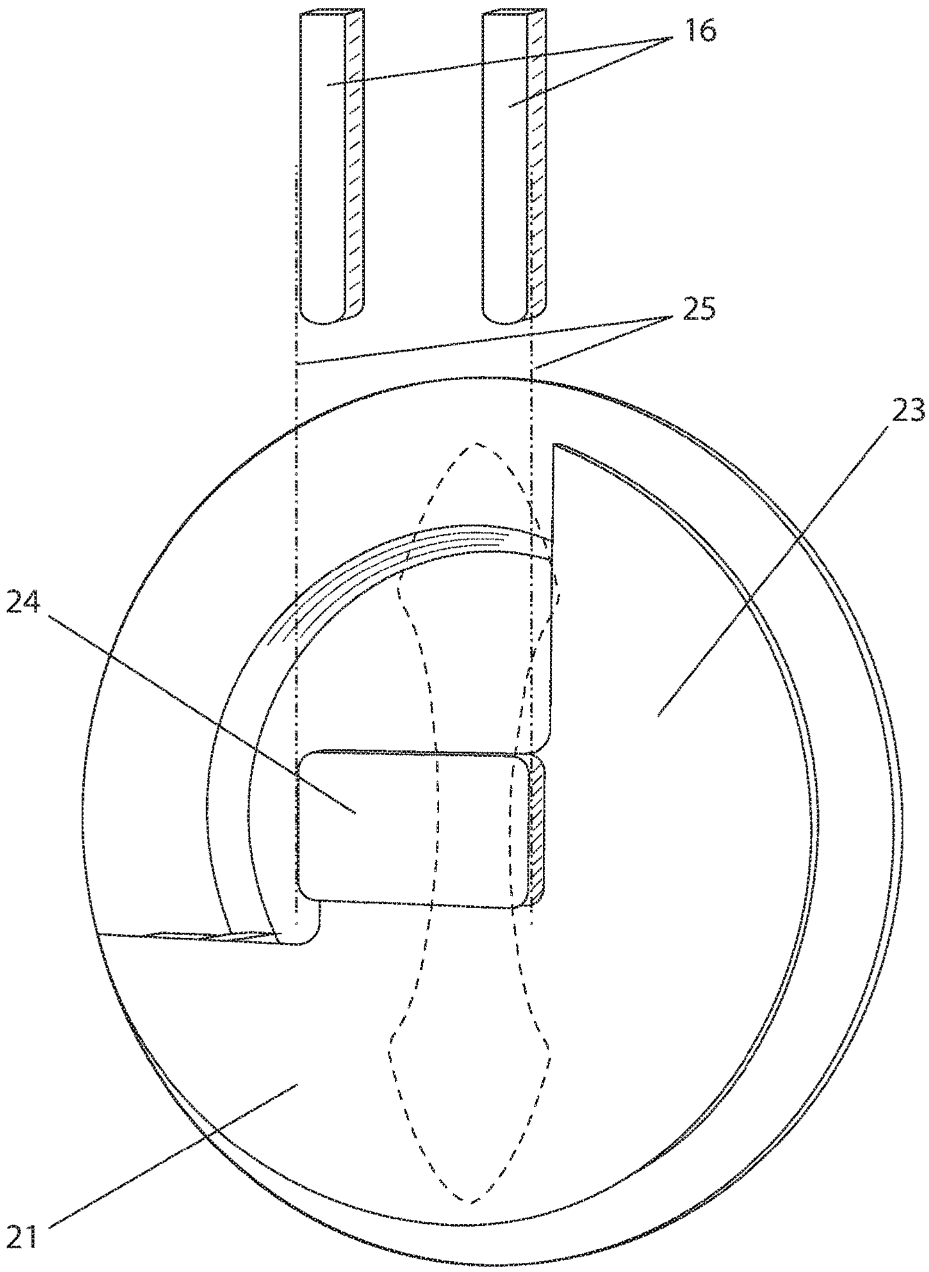
FIG. 4 presents a view of a rotary knob construction oriented in its default locked position in a preferred embodiment of the present invention.

FIG. 4 shows the back of an assembled knob construction 23 oriented in its default locked position in a preferred embodiment of the present invention. When in this default rotational position, a member (herein referred to as a slide member 24) on the knob insert 21 is oriented so that its width 25 cannot pass through the slide block 16 on the baseplate 13. This interference between the slide block 16 and the slide member 24 prevents the cover assembly 15 from being slid open to expose the underlying electrical switches.

Figure 5:
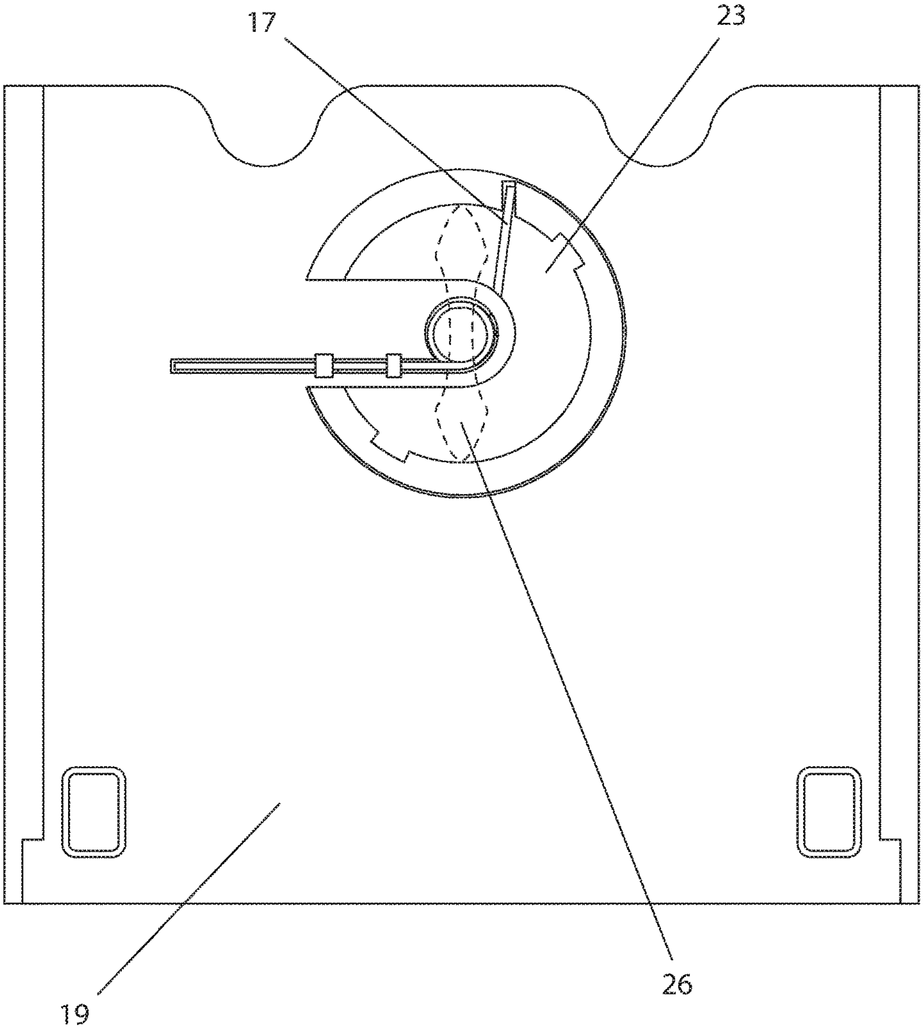
FIG. 5 presents a view of a torsion spring installed in the rotary knob construction.

The default locked position of the assembled knob construction 23 (shown without the knob insert 21 in FIG. 5 for easier visualization) is established by the torsion spring 17. When assembled, this torsion spring 17 is under compression and biases the knob construction 23 into a default rotational position that corresponds to the locked position of the slide member 24 given in FIG. 4. In this embodiment, the knob handle 26 is vertical in this default position. A minimum torque force of 0.90 lbs-in, inclusive, is preferred to provide sufficient resistance to rotation by a small child.

Figure 6:
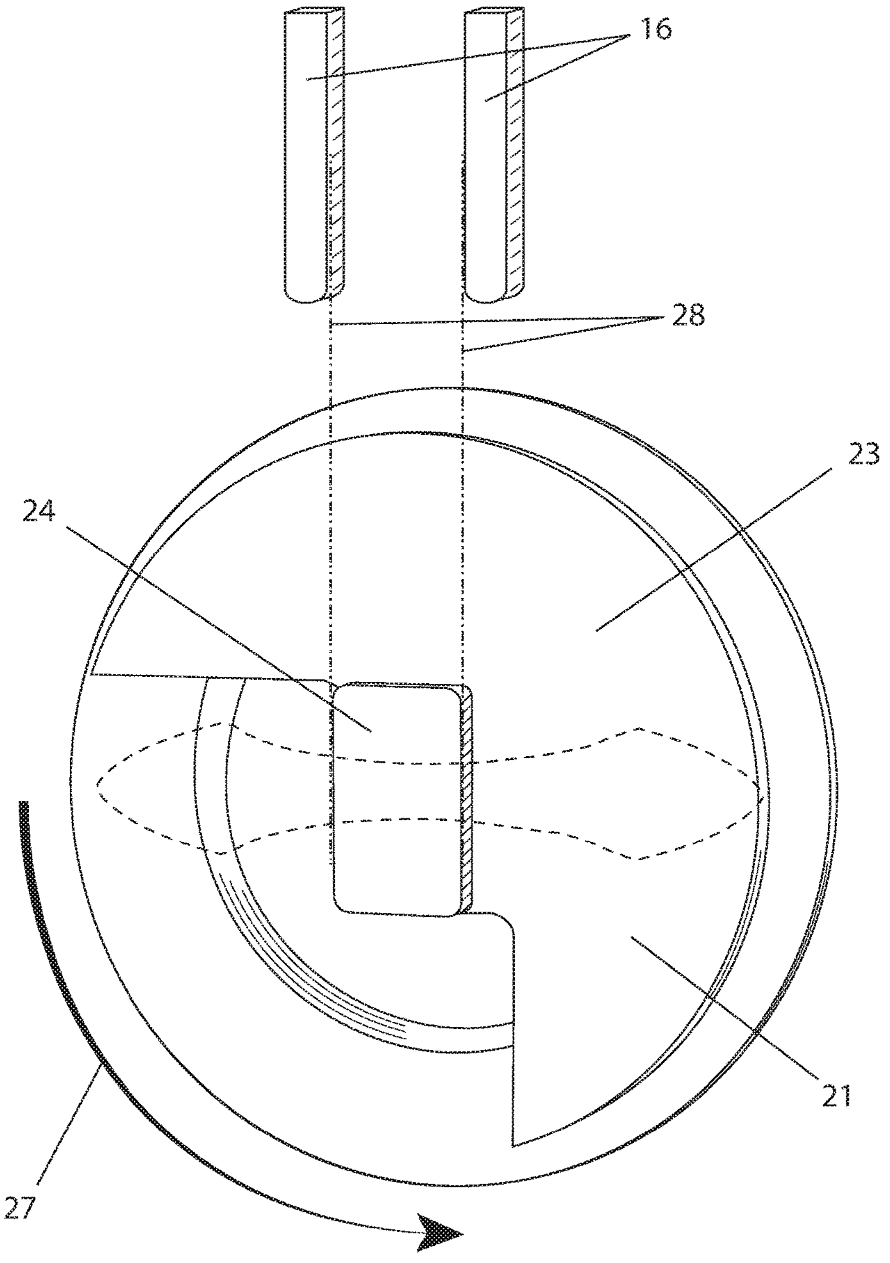
FIG. 6 presents a view of the rotary knob construction oriented in its unlocked position.
Figure 7:
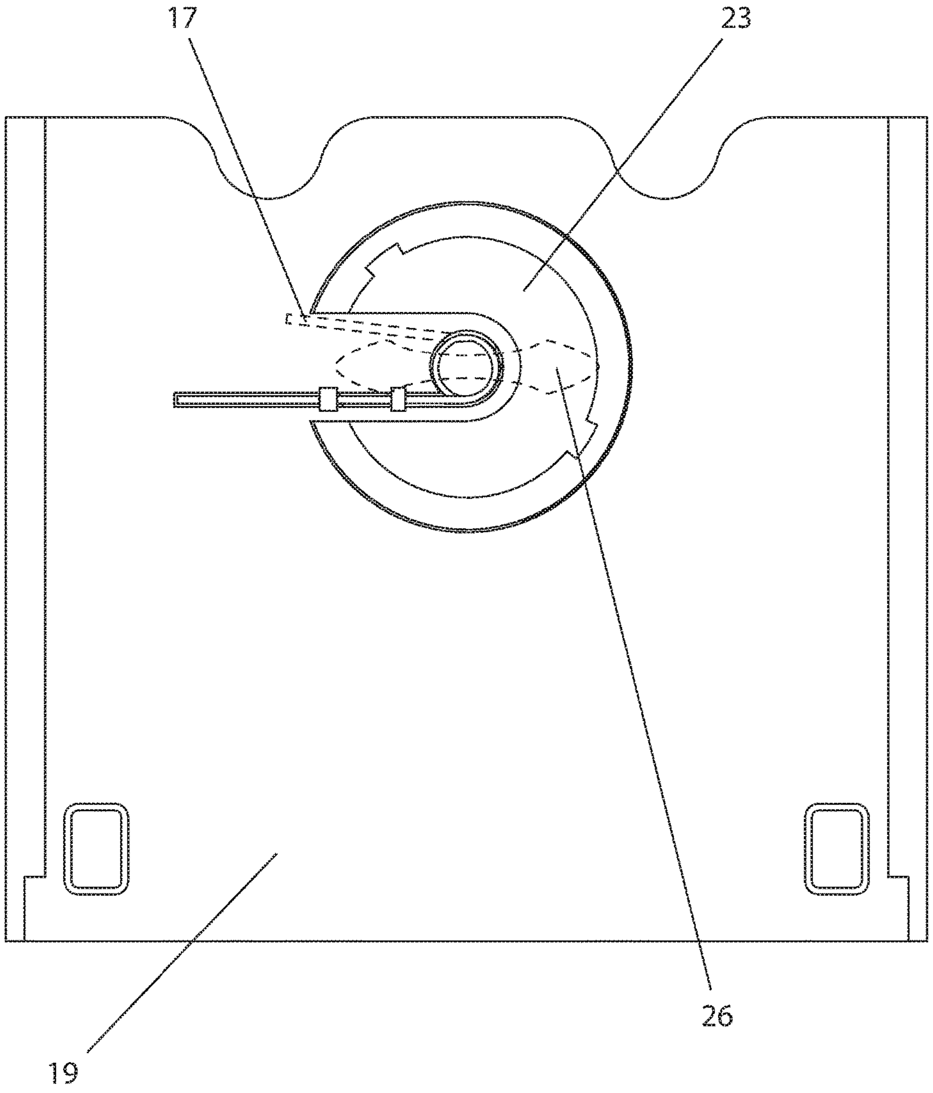
FIG. 7 presents a view of the torsion spring under compressed conditions when the rotary knob construction is rotated to the unlocked position.

When the knob construction 23 is rotated 90 degrees as indicated by the arrow 27 shown in FIG. 6, it is in an unlocked position where the slide member 24 on the knob construction 23 is now oriented so that its width 28 can pass through the slide block 16 on the baseplate 13. If the knob construction 23 is maintained in this condition, the cover assembly 15 is able to freely slide up along the guide rails 14A and 14B on the baseplate 13, thus allowing access to the electrical switches underneath. In the embodiment shown in FIG. 7, the knob handle 26 is horizontal when the knob construction 23 (shown without the knob insert 21 for easier visualization) is rotated to its unlocked position, and the torsion spring 17 is under higher compression. During rotation of the knob construction 23, the torsion spring 17 is progressively compressed, thus providing increasing resistance to the user against being rotated into the unlocked position.

Figure 8:
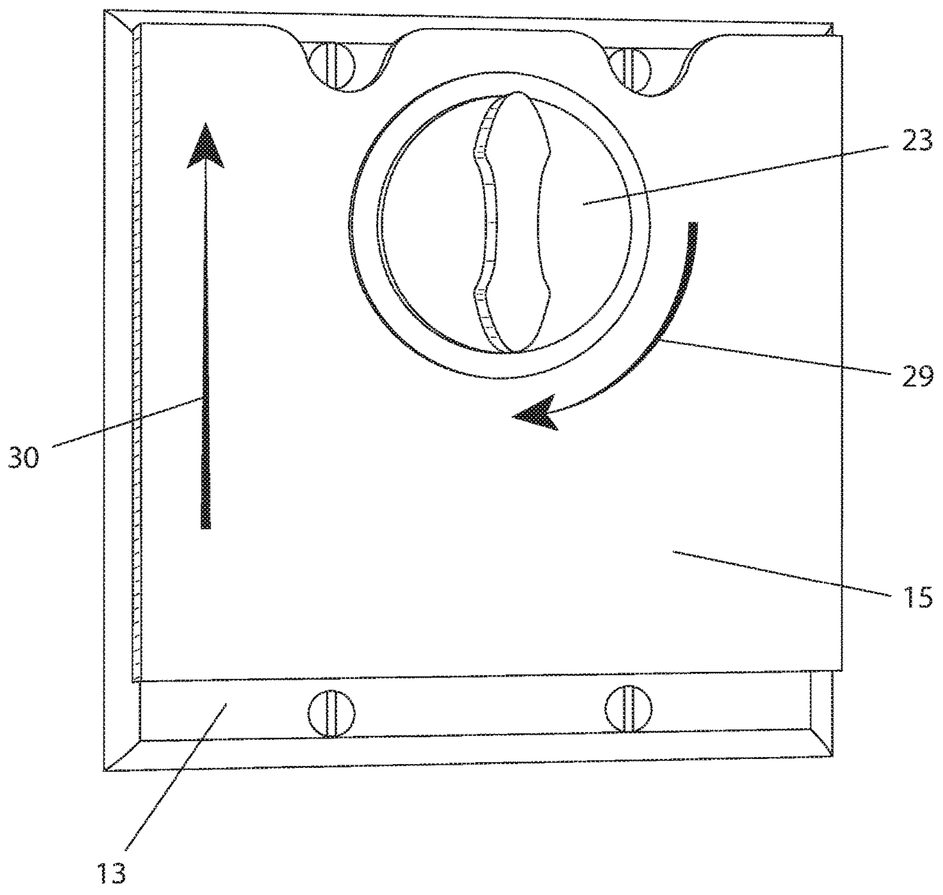
FIG. 8 illustrates the motions required to open a preferred rotary knob embodiment of the present invention.

FIG. 8 indicates the motions required to open a fully assembled and installed embodiment of the present invention. In this preferred embodiment of the present invention, the cover assembly 15 can only be slid open after the knob construction 23 is first rotated 29, then continuously maintained at a 90-degree rotational angle against the constant opposing force of the torsion spring 17 while sliding 30 the cover assembly 15 up until the reoriented slide member 24 is moved through the slide block 16 on the baseplate 13.

Figure 9:
FIG. 9 depicts a small child interacting with the present invention.

The effectiveness of the present invention to prevent small children from accessing electrical switches is established by the compulsory sequence of rotational and linear motions required to unlock and open it. Effectiveness is enhanced when installed onto an electrical wall switch with the intended location of the present invention 10 to be above a child's head, thus requiring the child to reach up as illustrated in FIG. 9. To open the present invention in the shown embodiment, the cover assembly 15 is pushed further and further away from the child, thus making it increasingly difficult to maintain the necessary 90-degree knob rotation 29 against the force of the torsion spring 17 to keep the knob construction 23 in an unlocked position. Furthermore, the cover assembly 15 is moved against the opposing force 22 of gravity, adding to the difficulty of pushing and maintaining the cover assembly 15 up to obtain access to the electrical switches. Such a combination of rotational 29 and linear 30 manipulations shown in FIG. 8, coupled with the opposing/resistive forces of the torsion spring 17 and gravity 22, and an unfavorable angle of approach from below as illustrated in FIG. 9, create a circumstance which makes the effectiveness of the present invention particularly robust against short-statured individuals with developing motor skills such as small children. In fact, any individual that must reach up in a similar manner will encounter varying degrees of difficulty.

In contrast, the same present invention designed to frustrate small children with a multitude of challenges is an uncomplicated and intuitive device for an adult to use. The strength and developed motor skills of adults are more than sufficient to overcome the force of the torsion spring 17 and maintain the necessary rotational position of the knob construction 23 while simultaneously lifting the cover assembly 15, and the adult's height eliminates any difficulties with the lifting action itself. For an adult, the operation is a simple, one-handed manipulation to access the electrical switches underneath, which further enhances ease-of-use.

Figure 10A:
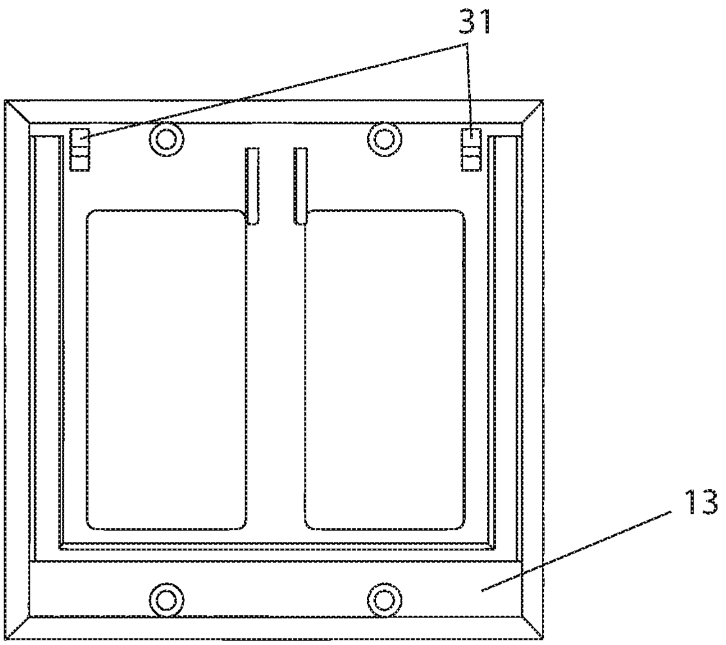
FIGS. 10A-C reveal features in the baseplate and the cover components of the present invention that contribute to the ease-of-use attributes for an adult user.
Figure 10B:
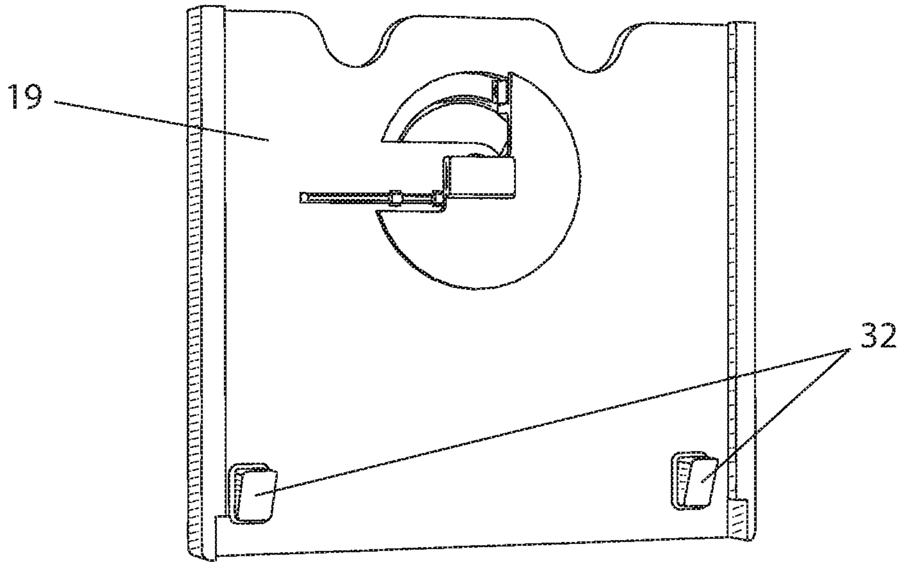
Figure 10C:
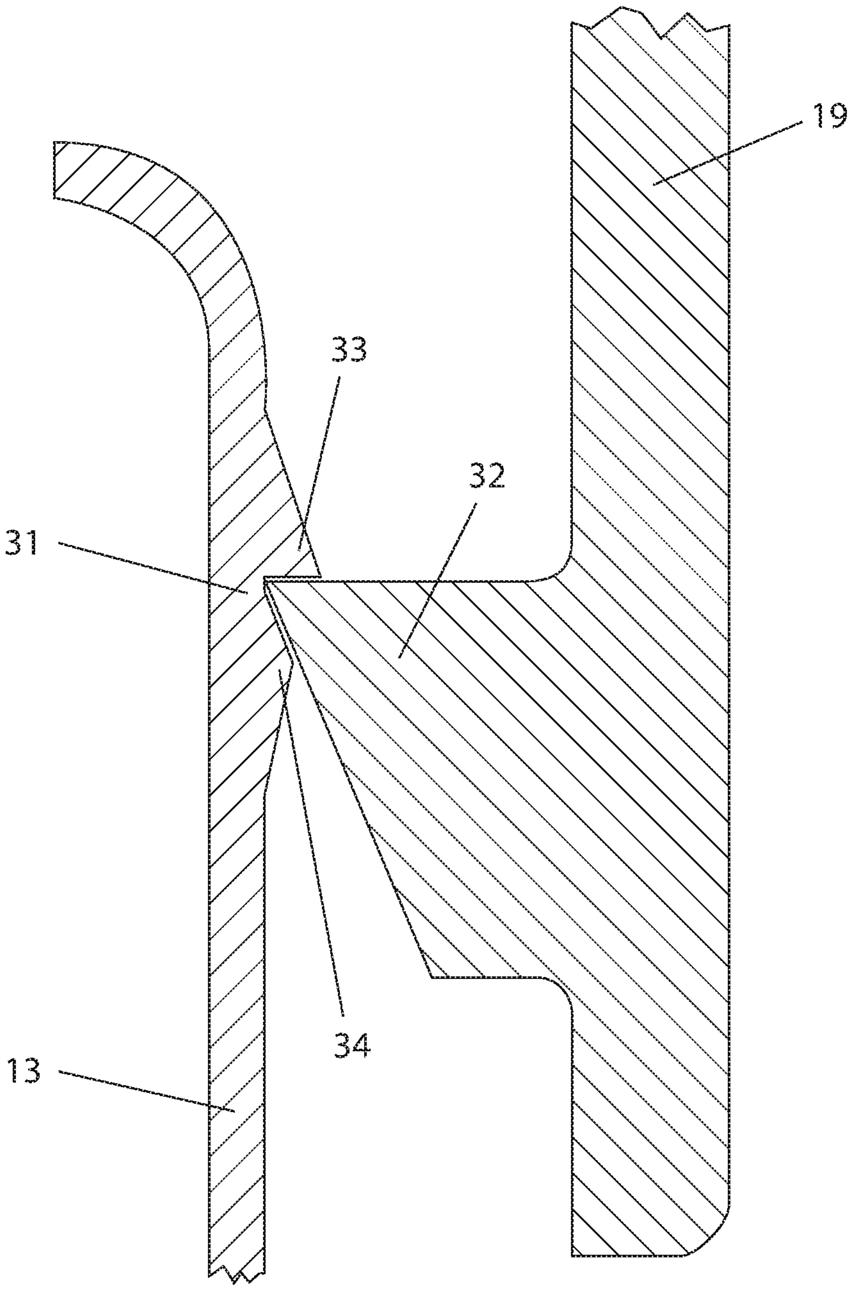

To provide additional convenience for the adult, further refinements can be made to the baseplate 13 and cover 19. For example, FIGS. 10A and 10B show that features can be added to the baseplate 13 (herein referred to as retaining tabs 31) to engage with features added to the cover 19 (herein referred to as retaining protrusions 32) to keep the cover assembly 15 in an open position while also preventing it from sliding completely off the baseplate 13 when the cover assembly 15 is slid up to expose the electrical switches underneath. The mechanical engagement of these convenience features is shown in FIG. 10C. The top tabs 33 of the retaining tabs 31 on the baseplate 13 extend sufficiently outward from a face of the baseplate 13 to prevent the retaining protrusions 32 on the cover 19 from sliding up and past them; however, the bottom tabs 34 are tapered and extend to a lesser extent than the top tabs 33, thus allowing the retaining protrusions 32 in the cover 19 to slide over them but will gently engage them to hold the cover assembly 15 in an open position.

Thus, the present invention is able to satisfy the seemingly competing goals of being difficult to operate by a small child while still being extremely easy and convenient for an adult to use on a frequent basis. Devices that do not satisfactorily achieve this balance would be annoying or burdensome to use and quickly abandoned by the adult.

Also, given that the baseplate 13 only contains stationary features that cannot be easily damaged, the baseplate 13 can conveniently be left in place with the cover assembly 15 removed completely when its protection function is temporarily not (or no longer) required.

Figure 11:
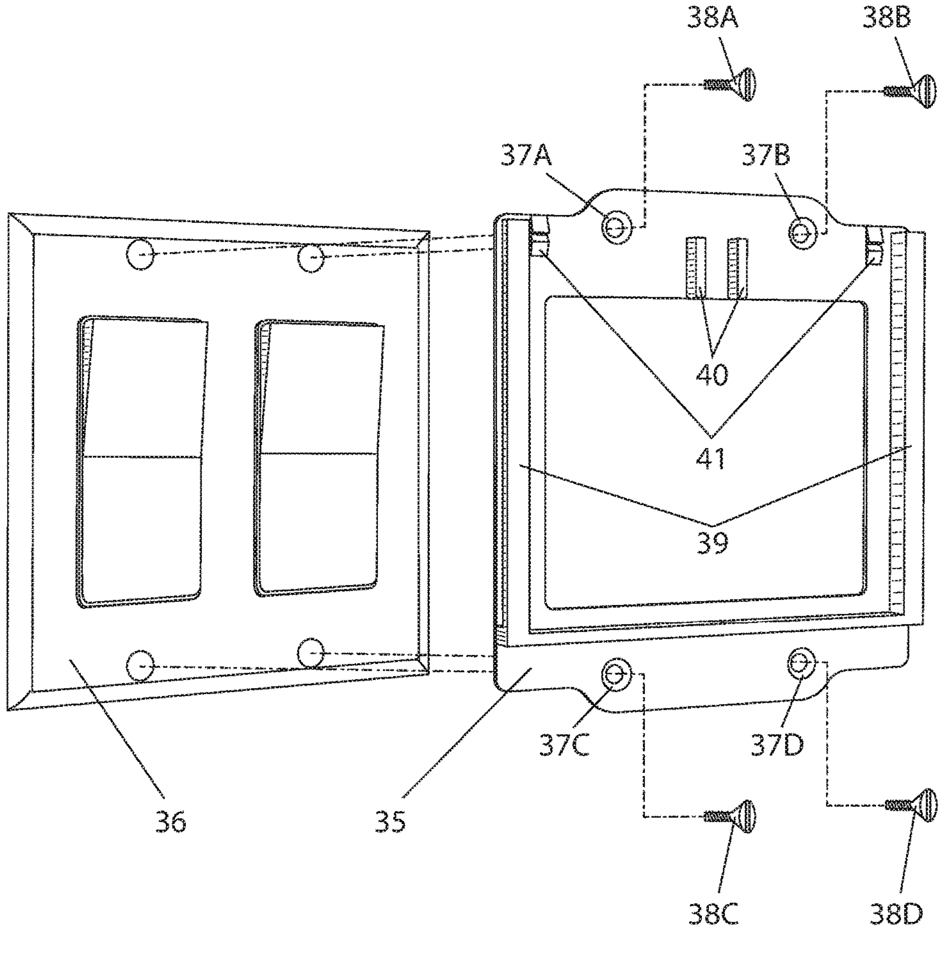
FIG. 11 shows a different embodiment of the baseplate of the present invention that does not require replacement of the original switch cover plate.

An embodiment of the present invention that does not require removal or replacement of the original wall plate for a switch is shown in FIG. 11. In this embodiment, an attachable faceplate 35 is installed onto an existing switch 36. This faceplate 35 contains appropriately shaped and placed switch openings to allow the switches to project through, as well as top and bottom flange members containing openings 37A-D for placement of fastening screws 38A-D. The faceplate 35 additionally contains all the necessary features (guide rails 39, slide block 40, and retaining tabs 41) to properly interact with the aforementioned cover assembly 15. The fastening screws 38A-D are used to secure the faceplate 35 directly onto the existing switch 36, although other means for affixing the faceplate 35 (including double-sided tape, flexible resilient open hooks such as Velcro elements, or an adhesive) are possible.

Figure 12A:
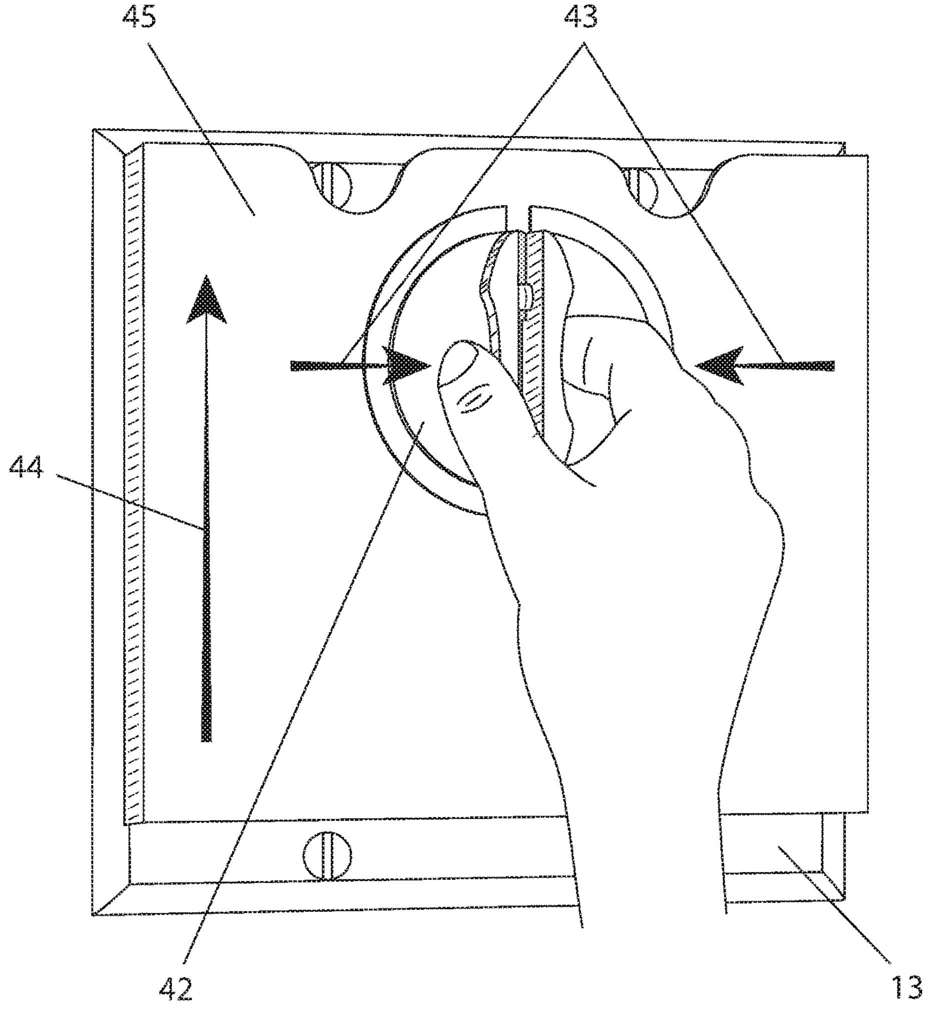
FIGS. 12A-D describe a different embodiment of the present invention where an alternate knob construction is used to control the latch mechanism.

Yet other embodiments of the present invention are possible with different constructions of the knob or knob assembly that require different forms of manipulations and motions to open them. In FIG. 12A, for example, a pinch-knob assembly 42 that requires a pinching action 43 to reduce the width or alter the shape of a slide member construction so that it may pass through the slide block 16 on the baseplate 13 would also be effective. The motion 44 of a cover assembly 45 up and away from the floor would make it difficult to maintain the pinching action 43 on the knob assembly 42, especially for a small child reaching up at the present invention from below.

Figure 12B:
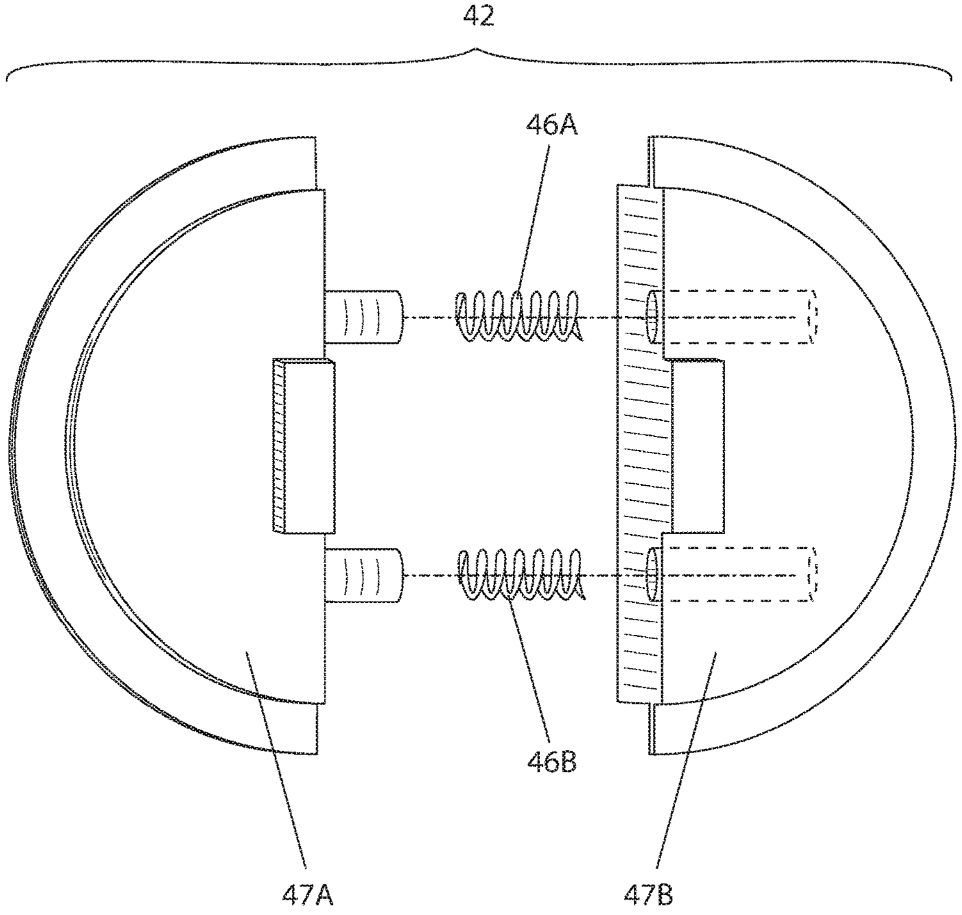
Figure 12C:
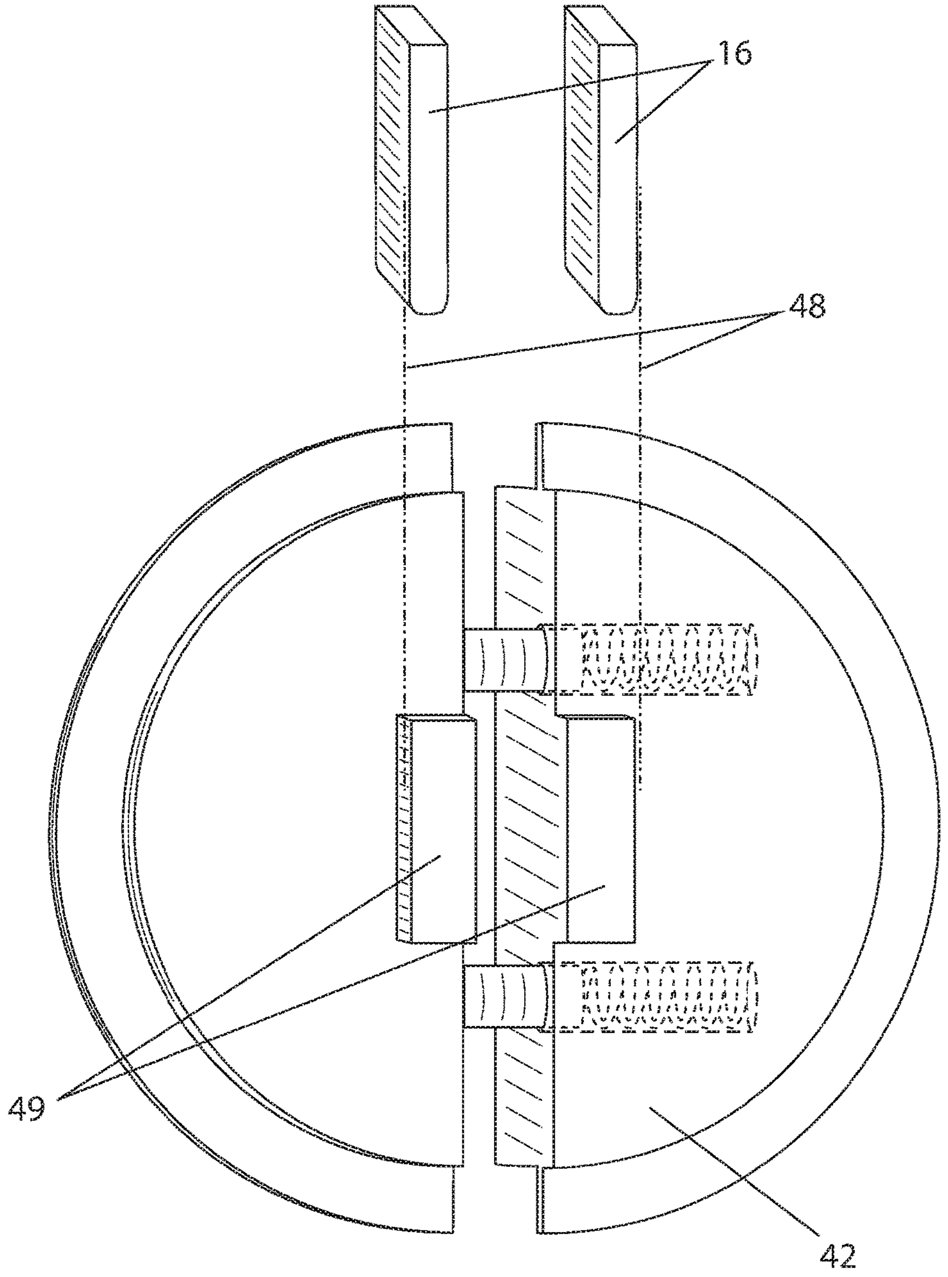
Figure 12D:
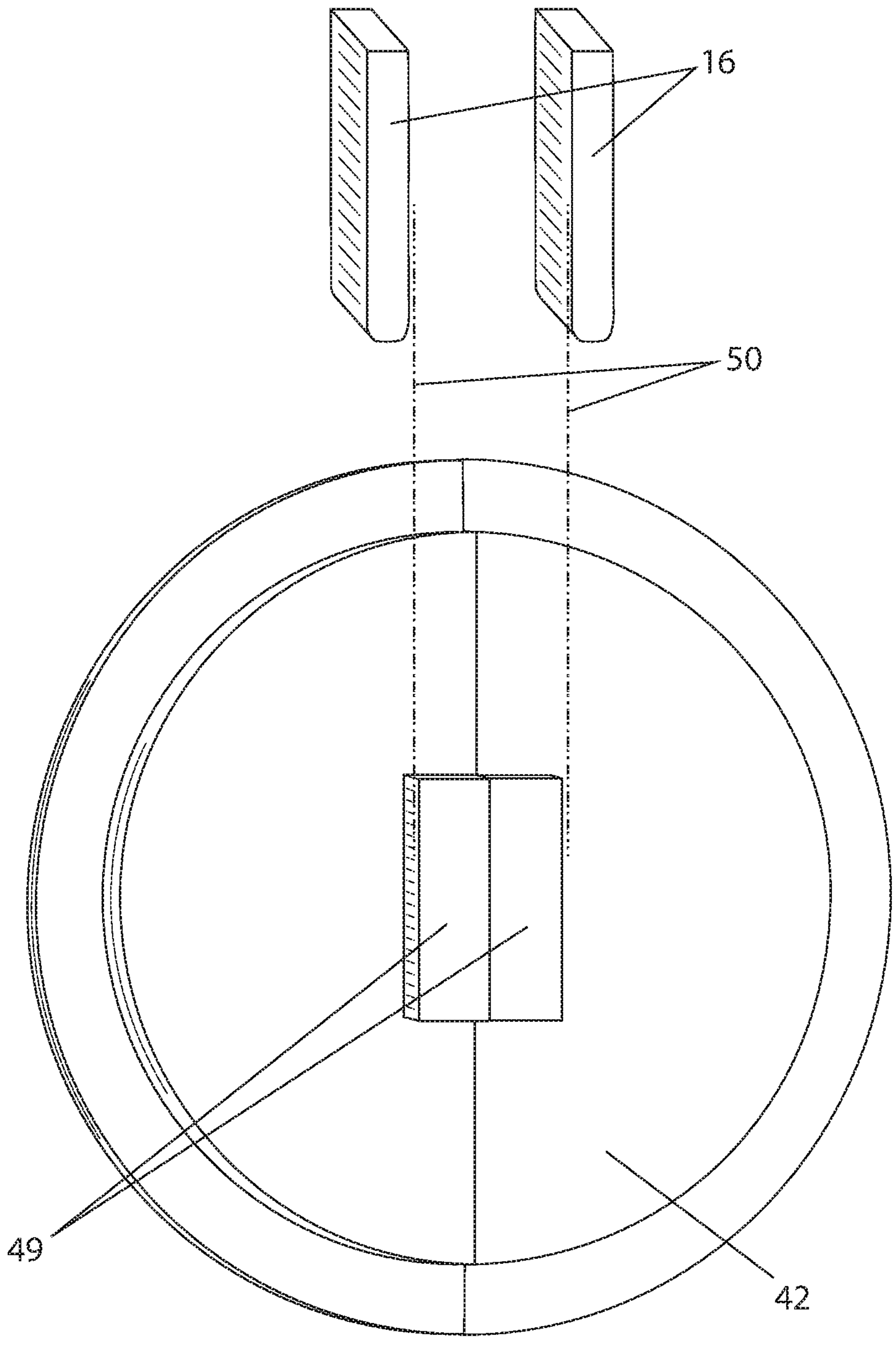

In the exploded diagram of the pinch-knob assembly 42 in FIG. 12B, compression springs 46A and 46B are assembled into the two halves 47A and 47B of the pinch-knob assembly 42 to force them apart into a default locked position where the two halves 47A and 47B are separated. In the default locked position of the assembled pinch-knob assembly 42 shown in FIG. 12C, the span 48 of a slide member construction 49 formed by the pinch-knob assembly 42 is too wide to slide through the channel in the slide block 16 on the baseplate 13, thus preventing the cover assembly 45 from being slid up to expose the underlying switches. Only when fully pinched and maintained (as shown in FIG. 12D) will the reduced span 50 of the pinched slide member construction 49 of the pinch-knob assembly 42 fit through the channel in the slide block 16.

Figure 13A:
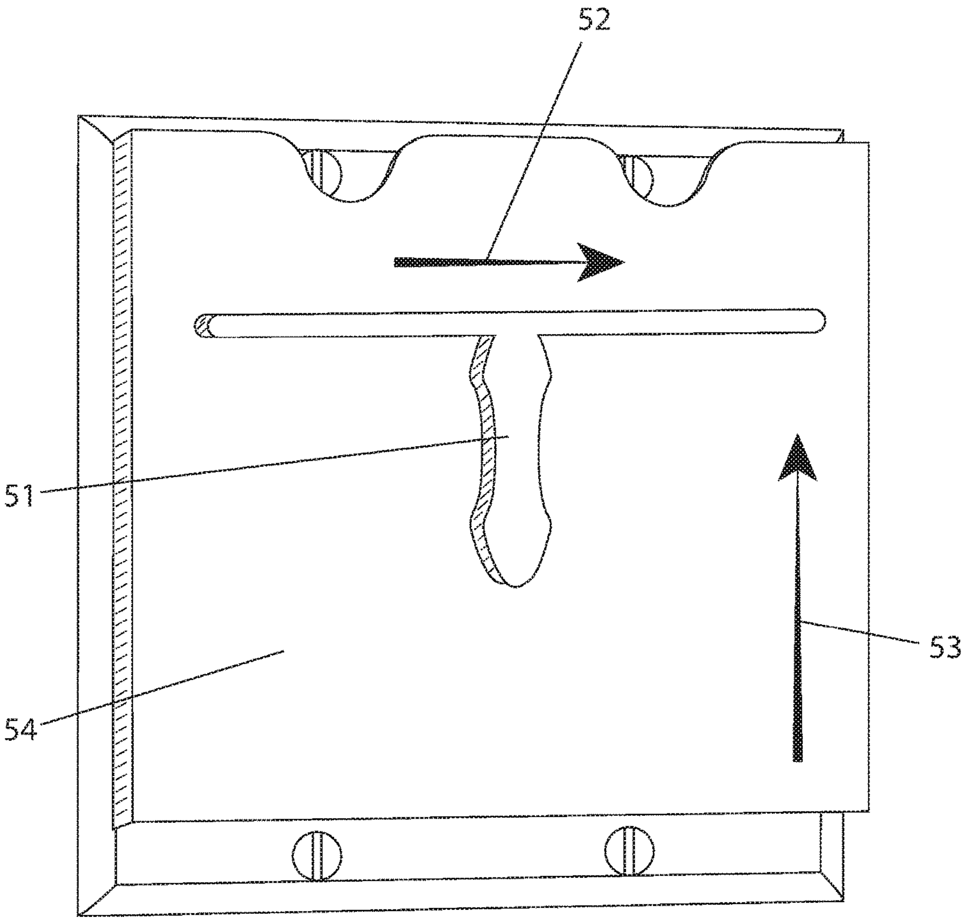
FIGS. 13A-C describe a different embodiment of the present invention with an alternate handle construction and latch mechanism.

Different constructions of the latch mechanism yield other embodiments of the present invention. One such embodiment is shown in FIG. 13A where a linear manipulation is required to unlock the latch mechanism. Here, a handle construction 51 is first displaced laterally 52, then this displacement should be maintained while sliding up 53 a cover assembly 54.

Figure 13B:
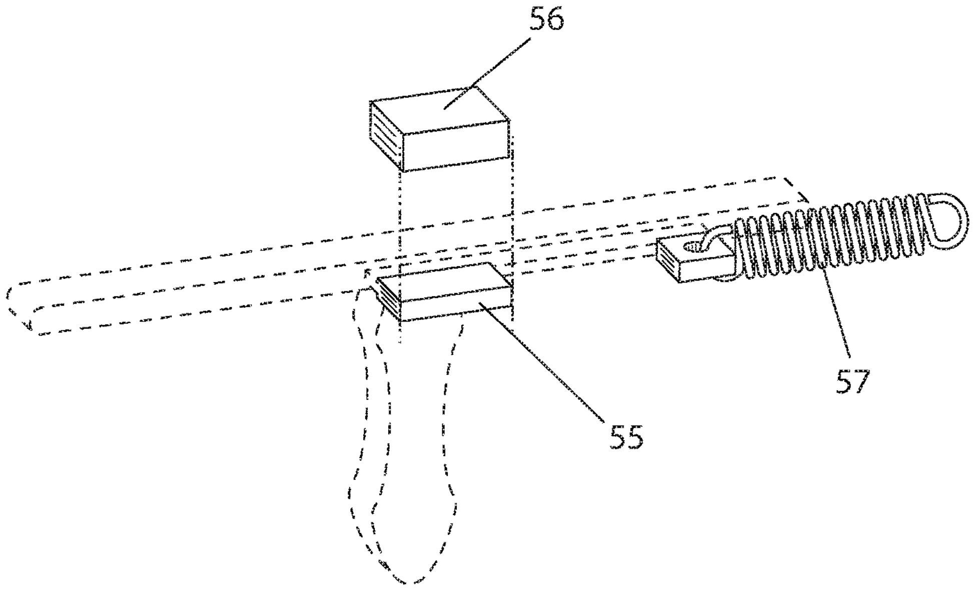
Figure 13C:
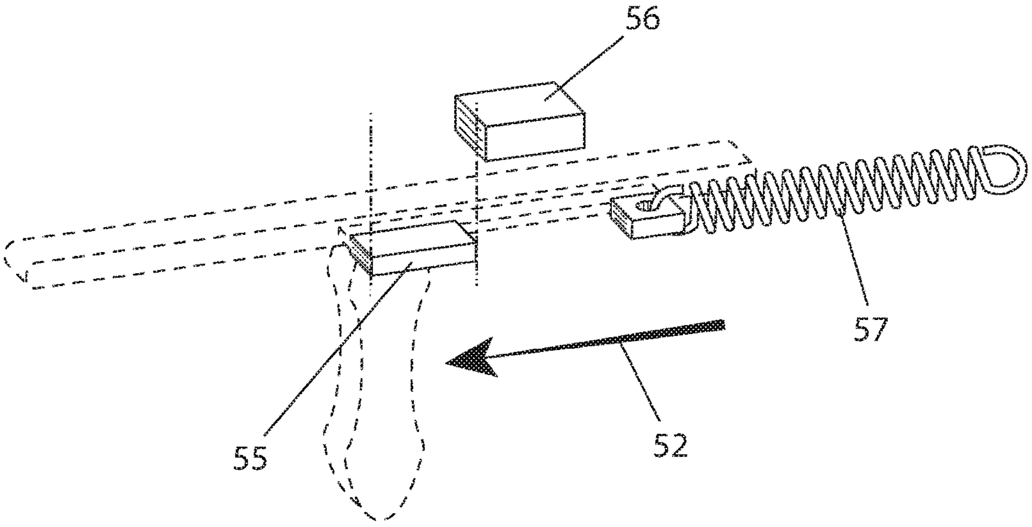

Some details of a latch mechanism embodiment for FIG. 13A are shown in FIGS. 13B and 13C. Displaying only the latching components of the mechanism, the back of the handle construction 51 is shown, where the location of its slide member 55 in FIG. 13B interferes with a slide block 56 (which represents a different embodiment of the slide block 16 on the baseplate 13) when the handle construction 51 is in its default locked position. This interference prevents movement of the cover assembly 54 up to access the underlying switches. An extension spring 57 provides a resistive force to 1) oppose the lateral displacement 52 of the handle construction 51 into an unlocked position, and 2) bias the latch mechanism into its default locked position. FIG. 13C shows the handle construction 51 in an unlocked position, wherein the slide member 55 has been displaced 52 so that it no longer interferes with the slide block 56, thus allowing the cover assembly 54 to be slid open.

Figure 14A:
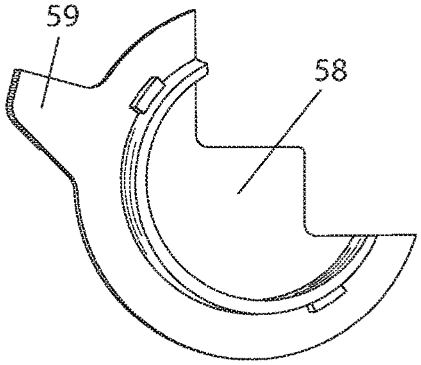
FIGS. 14A-C describe a different embodiment of the present invention with an alternate latch mechanism.
Figure 14B:
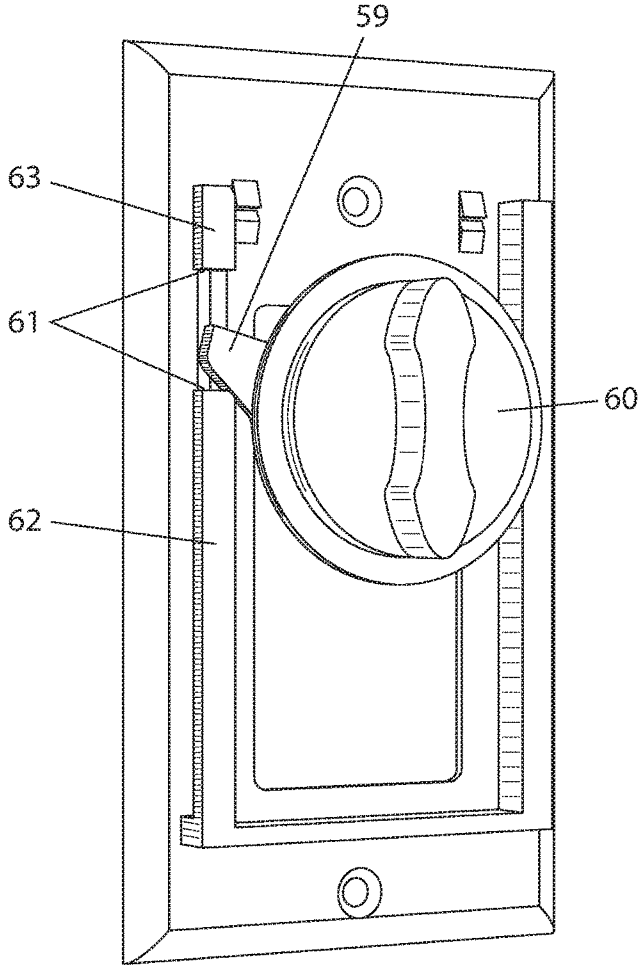
Figure 14C:
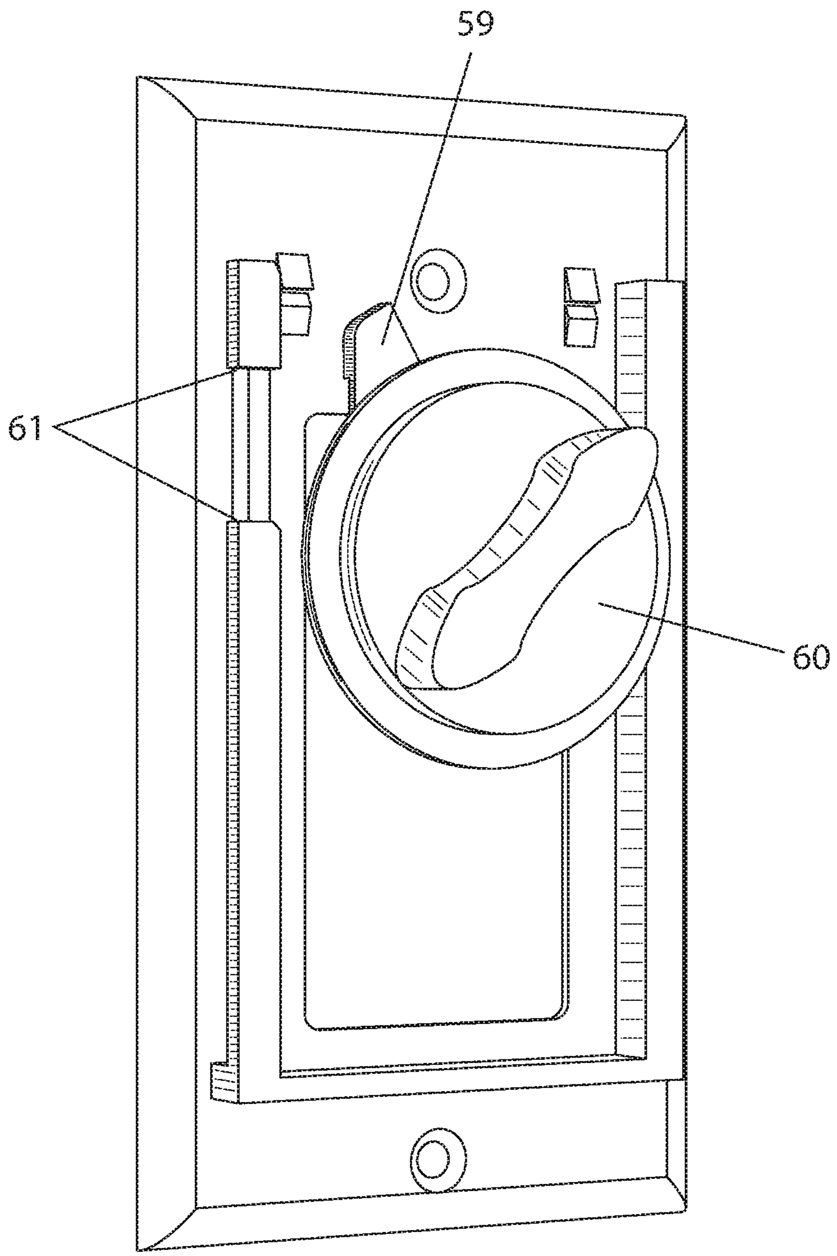

The specific configuration or dimensions of the switch being protected may enable other embodiments of the latch mechanism. For example, FIGS. 14A-C describe an embodiment with a latch mechanism that can be utilized for a single switch configuration. A knob insert 58 given in FIG. 14A contains a stop arm feature 59 rather than a slide member. Due to the closer proximity of the guide rails to the knob assembly offered by the narrow width of a single switch configuration, this latch mechanism embodiment utilizes the stop arm 59 to interlock with a gap cut into a guide rail on a baseplate to provide a locking condition. FIG. 14B illustrates this embodiment (shown assembled but without a cover component for easier visualization) in a default locked position. The stop arm 59 constructed into a knob assembly 60 is captured in a stop gap 61 located in a guide rail 62 and prevents movement of the cover (not shown) up to expose the switch underneath. Here, guide rail material 63 above the stop gap 61 serves as the slide block feature that interferes with the stop arm 59. When the knob assembly 60 is sufficiently rotated, as shown in FIG. 14C, the stop arm 59 is no longer captured in the stop gap 61, and the present invention can be slid open. As described in aforementioned embodiments, a torsion spring assembled into the cover (not shown) and knob assembly 60 provides the resistive force to bias it into the default locked position.

Figure 15A:
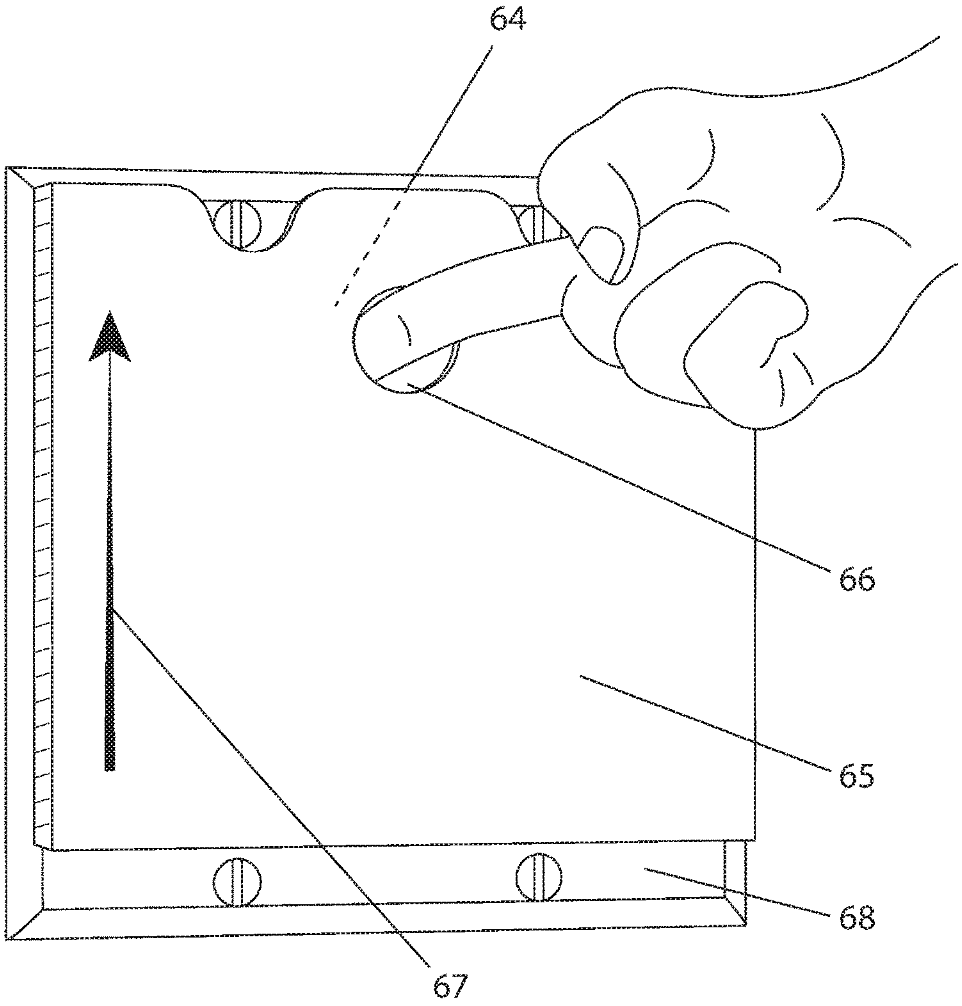
FIG. 15A-C shows another embodiment of the present invention that does not use a knob or handle construction but uses an approach that accomplishes the same latching function.
Figure 15B:
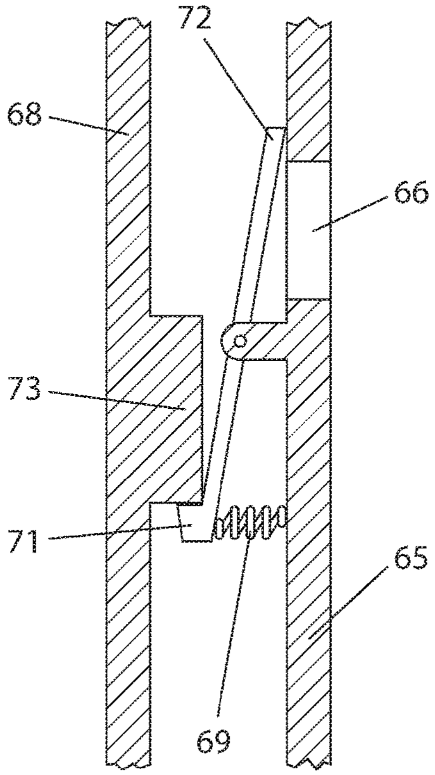
Figure 15C:
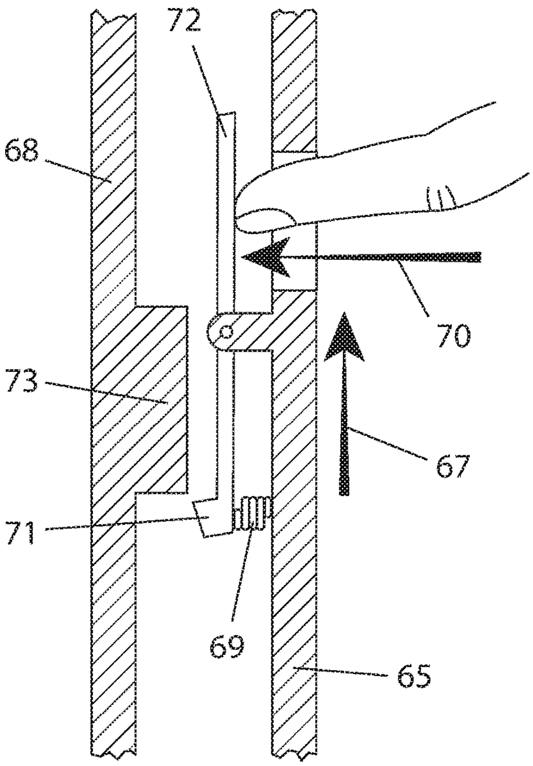

As shown in FIG. 15A, a knob or handle interface can be eliminated altogether. In this embodiment, an unlocking means 64 for a latch mechanism is located inside a cover 65. The cover 65 can only be slid open to reveal the electrical switches underneath if the latch mechanism is accessed through an opening 66 in the cover 65 and unlocked while the cover 65 is slid up 67 on a baseplate 68. Such a latch mechanism using a depressible lever embodiment is shown in FIGS. 15B and 15C. This latch mechanism utilizes the same principles of biasing the mechanism into a default locked position (here, using a compression spring 69) and requires a sustained pushing action 70 to pivot a latch member 71 on a latch lever 72 away from a slide block 73 on the baseplate 68 to unlock the cover 65 and slide it up 67.

The present invention does not require any unusual material or method of manufacture. It is preferably made of electrically non-conductive thermosetting or thermoplastic composition, as by injection molding or other suitable process.

While the invention has been described with respect to electrical switches, it can be used as a protective cover for any type of wall-mounted electrical interface including electrical switches, electrical outlets or receptacles, computer ports, charging outlets such as USB ports, and the like.

The above disclosure is intended to be illustrative and not exhaustive. While the present invention has been described in terms of particular embodiments, it is not intended that the descriptions given herein in any way limit its scope to any such embodiments and applications. It should be understood that many variations, modifications, substitutions, and changes in the described embodiments and details of the method and design illustrated herein and of their operation can be made by those skilled in the art without departing from the spirit and scope of this invention.

What is claimed is:

1. A protective guard for a wall-mounted electrical interface comprising:

a baseplate to be mounted to the wall and containing at least one opening to expose the electrical interface;

a cover slidably attached to the baseplate and slidably moving between a closed position that blocks access to the electrical interface and an open position that exposes the electrical interface;

a spring-biased latch attached to the cover, the latch being actively spring-biased to a locked position that holds the cover in the closed position and having an unlocked position offset from the locked position which allows sliding movement of the cover to its open position to expose the electrical interface; and wherein:

the latch includes a slide member;

the baseplate includes a slide block that blocks the slide member when the latch is in the locked position and allows the slide member to slide past the slide block when the latch is in the unlocked position.

2. The protective guard of claim 1, wherein the latch has a spring and a manually rotatable knob biased by the spring to the locked position to hold the cover in the closed position, the knob switching to the unlocked position when force is applied to rotate against the biasing of the spring such that the knob automatically goes back to the locked position when the force is removed.

3. The protective guard of claim 1, wherein the latch includes a rotary latch whose unlocked position is circumferentially offset from the locked position.

4. The protective guard of claim 1, wherein the latch includes a rotary latch whose unlocked position is circumferentially offset from the locked position, the rotary latch having a spring and a manually rotatable knob biased by the spring to the locked position to hold the cover in the closed position, the knob switching to the unlocked position when force is applied to rotate against the biasing of the spring such that the knob automatically goes back to the locked position when the force is removed.

5. The protective guard of claim 1, wherein:

the electrical interface includes a wall switch; and the base plate is to be mounted over the wall switch to expose the wall switch through the opening.

6. The protective guard of claim 5, wherein the slide block includes a pair of projections to define a channel and the slide member includes an elongate member whose length is greater than the width of the channel and whose width is smaller than the channel width.

7. The protective guard of claim 1, wherein the baseplate includes a guide rail and at least one stationary feature extending from a surface of the baseplate that interferes with at least one stationary feature extending from a surface of the cover to stop the cover from sliding off the guide rail of the baseplate.

8. The protective guard of claim 1, wherein the latch includes an extension spring attached to the cover.

9. The protective guard of claim 1, wherein:

the baseplate is to be mounted over at least one electrical interface; and the height of the cover is sufficiently high to cover the electrical interface projecting over the wall.

10. The protective guard of claim 1, wherein:

the latch includes a rotary latch whose unlocked position is circumferentially offset from the locked position, the rotary latch having a stop arm;

the baseplate includes a slide block that blocks the stop arm when the latch is in the locked position and allows the stop arm to slide past the slide block when the latch is in the unlocked position.

11. A protective guard for a wall-mounted electrical interface comprising:

a baseplate to be mounted to the wall and containing at least one opening to expose the electrical interface;

a guide rail;

a cover slidably attached to the baseplate and slidably moving along the guide rail between a closed position that blocks access to the electrical interface and an open position that exposes the electrical interface;

a rotary latch attached to the cover, the rotary latch having a locked position that holds the cover in the closed position and an unlocked position circumferentially offset from the locked position which allows sliding movement of the cover to its open position to expose the electrical interface.

12. The protective guard of claim 11, wherein the rotary latch is actively spring-biased to the locked position.

13. The protective guard of claim 11, wherein the latch has a spring and a manually rotatable knob biased by the spring to the locked position to hold the cover in the closed position, the knob switching to the unlocked position when force is applied to rotate against the biasing of the spring such that the knob automatically goes back to the locked position when the force is removed.

14. The protective guard of claim 11, wherein:

the latch includes a rotatable slide member;

the baseplate includes a slide block that blocks the slide member when the latch is in the locked position and allows the slide member to slide past the slide block when the latch is in the unlocked position.

15. The protective guard of claim 14, wherein the slide block includes a pair of projections to define a channel and the slide member includes an elongate member whose length is greater than the width of the channel and whose width is smaller than the channel width.

16. The protective guard of claim 11, wherein the baseplate includes a guide rail and at least one stationary feature extending from a surface of the baseplate that interferes with at least one stationary feature extending from a surface of the cover to stop the cover from sliding off the guide rail of the baseplate.

17. The protective guard of claim 11, wherein:

the baseplate is to be mounted over at least one electrical interface; and the height of the cover is sufficiently high to cover the electrical interface projecting over the wall.

18. The protective guard of claim 11, wherein:

the latch includes a stop arm;

the baseplate includes a slide block that blocks the stop arm when the latch is in the locked position and allows the stop arm to slide past the slide block when the latch is in the unlocked position.

19. A method of using a protective guard for a wall-mounted electrical interface, the protective guard having a baseplate mounted to the wall and containing at least one opening to expose the electrical interface, a cover slidably attached to the baseplate, and a spring-biased latch attached to the cover, the latch being actively spring-biased to a locked position that holds the cover in the closed position and having an unlocked position offset from the locked position, the latch including a slide member, the baseplate including a slide block that blocks the slide member when the latch is in the locked position and allows the slide member to slide past the slide block when the latch is in the unlocked position, the method comprising:

applying force to the actively spring-biased latch to change the latch to its unlocked position, the applied force allowing the slide member to slide past the slide block;

sliding the cover relative to the baseplate while simultaneously maintaining the applied force to keep the latch in the unlocked position to expose the electrical interface.

20. The method of claim 19, wherein the latch includes a rotary latch having a rotary knob and the step of applying force includes rotating the knob against the spring bias.

21. The method of claim 20, wherein the cover includes a rotatable slide member motion coupled to the rotary knob and the baseplate includes a slide block that blocks the slide member in a first orientation when the latch is in the locked position and allows the slide member in a second orientation to slide past the slide block when the latch is in the unlocked position.

22. The method of claim 21, wherein the rotatable slide member includes a rotary stop arm and the slide block of the baseplate blocks the rotary stop arm in the first orientation when the latch is in the locked position.

* * * * *